METHOD AND APPARATUS FOR COOLING AND LUBRICATING GAS TURBINE BEARINGS

Original Filed Feb. 23, 1956 3 Sheets-Sheet 1

INVENTOR.
WILLARD E. BUCK
BY
Edwin J. Spangler, Jr.
ATTORNEYS

Aug. 21, 1962 W. E. BUCK Re. 25,227

METHOD AND APPARATUS FOR COOLING AND LUBRICATING GAS TURBINE BEARINGS

Original Filed Feb. 23, 1956 3 Sheets-Sheet 2

INVENTOR.
WILLARD E. BUCK
BY
Edwin J. Spangler, Jr.
ATTORNEYS

INVENTOR.
WILLARD E. BUCK
BY
Edwin J. Spangler, Jr.
ATTORNEYS

United States Patent Office

Re. 25,227
Reissued Aug. 21, 1962

25,227

METHOD AND APPARATUS FOR COOLING AND LUBRICATING GAS TURBINE BEARINGS

Willard E. Buck, P.O. Box 357, Boulder, Colo.

Original No. 2,886,285, dated May 12, 1959, Ser. No. 567,148, Feb. 23, 1956. Application for reissue Jan. 11, 1960, Ser. No. 1,832
7 Claims. (Cl. 88—74)

Matter enclosed in heavy brackets [ ] appears in the original patent but forms no part of this reissue specification; matter printed in italics indicates the additions made by reissue.

This invention relates to air-cooled bearings; and more particularly, to a method and apparatus for air-cooling bearings of high-speed turbines.

In recent years a number of high-speed rotating systems have been developed which attain rotational speeds as high as 15,000 r.p.s. and are being used in devices such as centrifuges and rotating mirror cameras. Rotating mirror cameras, in particular, have been made which will take pictures at the rate of 3,500,000 frames per second utilizing a high-speed turbine-driven rotating mirror.

The design of a turbine which would achieve these tremendous rotational speeds involved the solution of a number of problems which were substantially unheard of in connection with conventional machine design. Turbines had to be developed which would spin a small polished steel mirror up to the bursting strength of the steel used.

One of the most difficult problems that had to be solved was the design of bearings which would withstand these rotational speeds and a cooling system which could be depended upon to keep the bearings cool during operation of the turbine. It was found that high-speed ball bearings were unsatisfactory and that pressurized-air bearings could not be used at speeds above 3000 r.p.s. without bearing failure. Therefore, liquid-lubricated bearings were found to be the only satisfactory type that would withstand the strain and heat without failing. These liquid-lubricated bearings were generally made of silver because of its excellent heat conductivity and the oil used for lubrication was continually circulated around the bearing at the rate of approximately 0.3 gallon per minute.

It has now been found, however, in accordance with the present invention that the design of high-speed turbines can be much improved and simplified through the us of a novel method and apparatus for air-cooling the bearing which eliminates the necessity for continuous circulation of the oil around the bearing. More specifically, the compressed air, hydrogen, helium or other gas utilized as a driving force for the turbine wheel is exhausted into an exhaust cavity adjacent the sealed liquid-lubricated bearing where it becomes quite cold due to expansion and, therefore, can be used to carry the heat away from the bearing out through the exhaust system. The degree of cooling attained by the aforementioned system is such that the lubricating oil need not be circulated around the bearing and all that is required is to maintain the lubricant under sufficient pressure to prevent the "oil-film whirl" effect from taking place due to the rotational speed of the mirror shaft.

It is, therefore, the principal object of the present invention to provide a novel air-cooling method and apparatus for cooling the liquid-lubricated bearings of high-speed turbines.

Another object of the invention is to provide a greatly simplified lubrication system for the bearings of a high-speed turbine.

A further object of the invention is to provide a high-speed turbine which does not require the conventional oil-circulation system to provide adequate cooling for the bearings.

Other objects will be in part apparent and in part pointed out specifically hereinafter in connection with the description of the drawing which follows, and in which.

Figure 1:
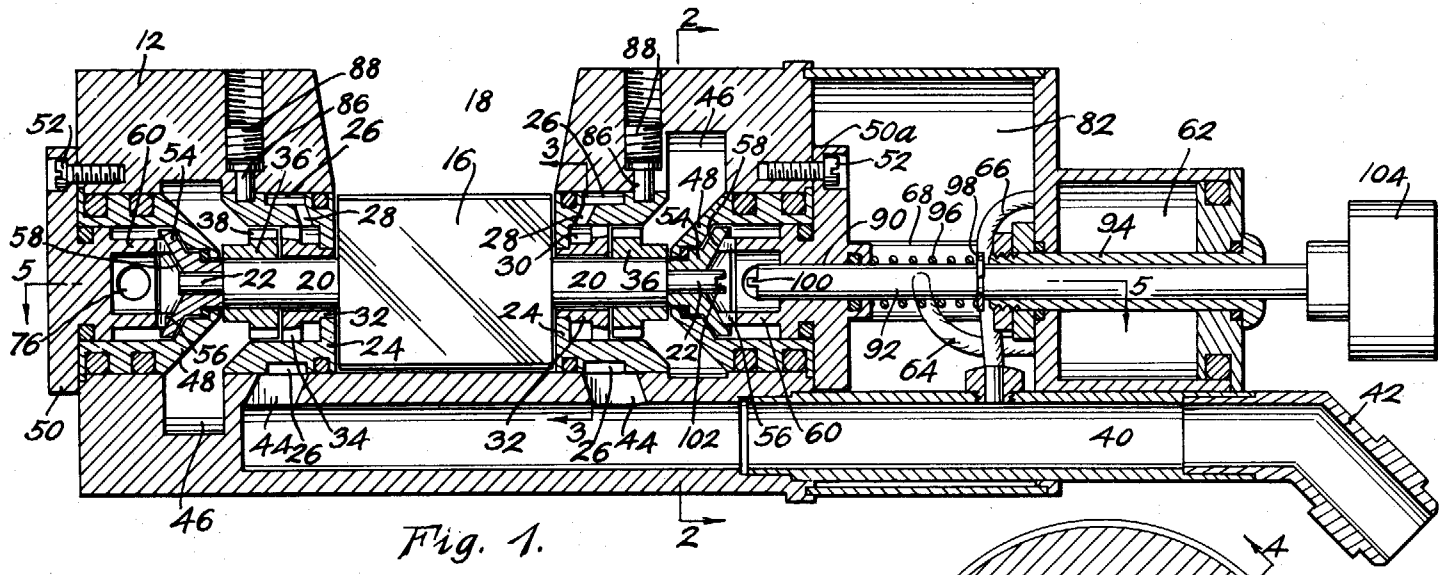
FIGURE 1 is a longitudinal section of a high-speed rotating-mirror turbine employing the novel air-cooled liquid-lubricated bearings of the present invention.

Referring now in particular to FIGURES 1 through 5 inclusive, of the drawing, it will be seen that the turbine is mounted in a main housing 12 having an axial opening 14, defining a hollow interior extending from end to end thereof, which receives the various elements of the turbine. Mirror 16 is inserted within the axial opening 14 adjacent opening 18 in the side of the main housing communicating with a central chamber and which admits light to the polished face of the mirror mounted within the central chamber to be reflected onto the surface of the film. The mirror is formed of steel or other high strength material and is provided with an integral mirror shaft 20 and journals 22 at each end.

Turbine housing elements 24 are positioned within the main housing adjacent each end of the mirror and are provided with an outer annular air passage 26 and a plurality of radial air passages 28 which interconnect the outer annular air passage with an inner annular air passage 30 formed between the turbine housing elements and elements 32 together defining an intake cavity which contain the stationary blades or nozzles 34 of the turbine. The turbine wheel or rotor 36 is attached to mirror shaft 20 for conjoint rotation and is provided with turbine blades 38 positioned to receive air from nozzles.

The main housing 12 contains a main compressed air line 40 connected by suitable fittings 42 to a source of compressed air or other gas, not shown. It should be mentioned that although the various elements of the turbine and operation thereof will be described in connection with compressed air as an operating medium, it is to be understood that other gases such as hydrogen and helium can be used and are enecessary for ultra high-speed operation.

The outer annular air passage of the turbine-housing elements is connected into main airline 40 by air intake ports 44. The high pressure air is introduced into the turbine through the main compressed air line 40, passes from the main line into the outer annular air passages 26 through air intake ports 44, then passes into the inner annular air passages 30 through the radial air passages 28, moves through the nozzles 34 against blades 38 of the turbine wheel and expands into exhaust cavity 46 which together with the intake cavity defines a gas chamber. The rapid expansion of the air in the exhaust cavity after it leaves the turbine blades causes the air to become quite cold before it passes over the surface of bearing housing 48. The bearing housings 48 fit into the ends of the axial opening 14 in the main housing and are retained in place by end plates 50 and 50a which are removably attached to the housing by bolts 52. The bearings 54 fit into the bearing housing and are held in place by fingers 56 which project inwardly against the inner conical surface 58 of the bearing from tubular portions 60 of the end plates. Journals 22 of the mirror shaft rotate within the bearings, as shown.

Oil for lubricating the bearings is supplied by means of a closed, pressurized oil system which will now be described. An oil reservoir 62 is provided at one end of the main housing and the oil level therein is maintained such that the entry to oil outlet tube 64 will remain covered. The oil is maintained under pressure at all times during operation of the turbine by by-pass air connection 66 which takes air from the main compressed air line into the oil reservoir at a point above the oil level. The oil outlet tube 64 interconnects the oil reservoir with main oil line 68, shown most clearly in FIGURE 5. Again with reference to FIGURE 5 it will be seen that the main oil line feeds oil into oil passages 70 and into the oil chamber to one side of the bearing housing through oil passages 72 in the main housing. In this manner the oil is introduced into annular cavity 74 between the inner surface of the bearing housing and the outer surface of the tubular portion 60 of the end plate. The high-speed rotational movement of the journal within the bearing causes the oil to move through opening 76 in the tubular portion 60 of the end plate, into the space within the oil chamber between the bearing and the bearing housing, and between the bearing and journal. Although the oil is not "circulating" in the sense of a fresh supply being constantly introduced into the bearings it is continually in motion due to the "swirling motion" imparted thereto by rotation of the journal. The oil is maintained under pressure at all times during operation of the turbine in order to prevent the "oil-whirl effect" from throwing the oil away from the journal in the well-known manner. The bearing, bearing housing and end plate are, of course, provided with suitable O-ring seals, as shown, to seal and maintain pressure within the liquid-lubricated bearing unit. Fingers 56 carried by the tubular portion 60 of the end plate maintain the bearing 54 in correct spaced relation to the bearing housing when no oil pressure is exerted thereon.

Figure 2:
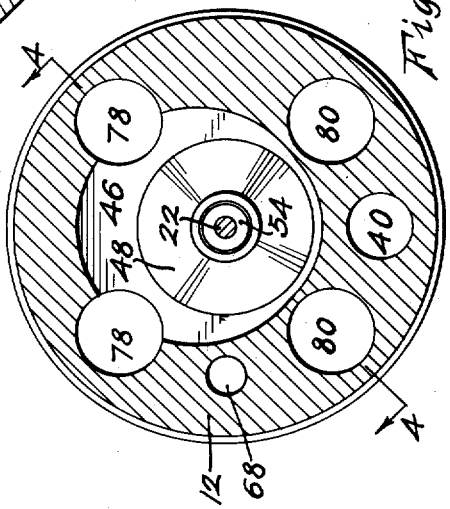
FIGURE 2 is a transverse section taken along line 2—2 of FIGURE 1.
Figure 3:
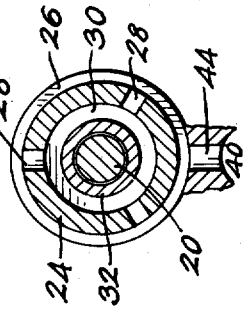
FIGURE 3 is a transverse section taken along line 3—3 of FIGURE 1.
Figure 4:
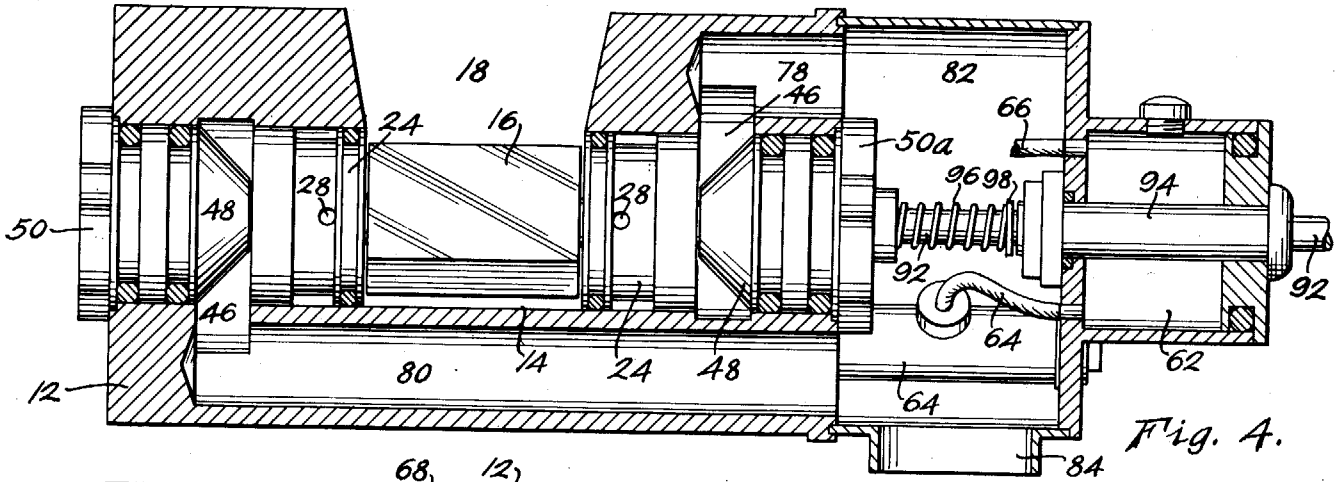
FIGURE 4 is a longitudinal section taken along line 4—4 of FIGURE 2.
Figure 5:
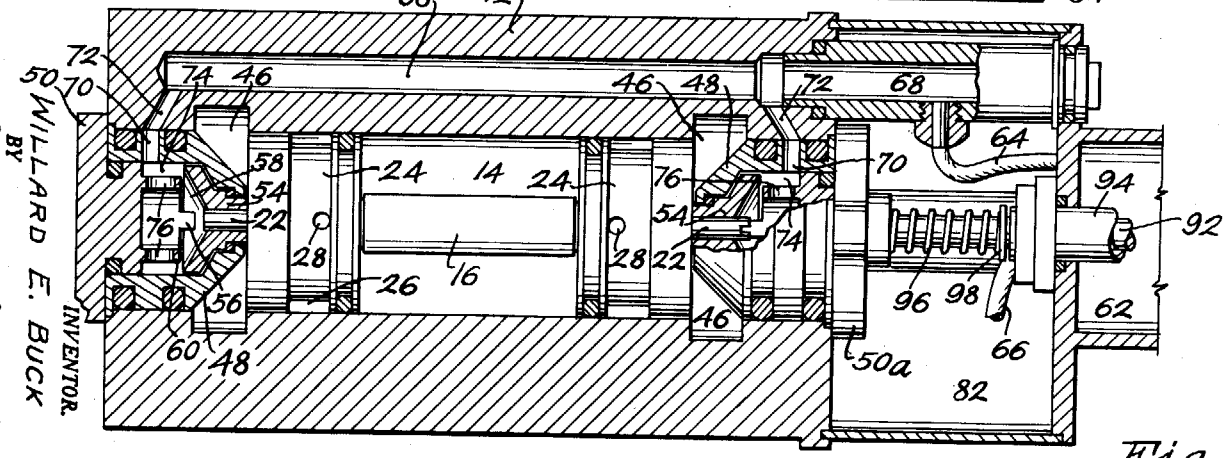
FIGURE 5 is a longitudinal section taken along line 5—5 of FIGURE 1.

Exhaust cavity 46, shown most clearly in FIGURE 2, at the front or oil reservoir end of the turbine exhausts through exhaust passages 78 in the main housing. The exhaust cavity at the rear end of the turbine exhausts through exhaust passages 80, as shown most clearly in FIGURE 4. All of the exhaust passages open into chamber 82 which is open to the atmosphere through opening 84 therein.

The turbine housing element 24 is provided with suitable O-rings, as shown, to prevent leakage of air into the mirror cavity and is maintained in place within the main housing by pins 86 and set screws 88. End plate 50a on the front end of turbine is slightly modified to provide an axial opening 90 to receive shaft 92 for rotational movement therein. Shaft 92 is journaled for rotation in tubular element 94 which passes through the oil reservoir and is pressure-sealed therein. Shaft 92 is also mounted for longitudinal slidable movement in the tubular element and the end plate 50a and is maintained in retracted position by compression spring 96 acting between the end plate and stop 98 of the shaft. The rear end of the shaft is provided with a tongue 100 adapted to fit into the notched-end 102 of the front journal. The sole function of shaft 92 is to permit manual rotation of the mirror by rotating knob 104 while the shaft is interlocked with the mirror.

Figure 6:
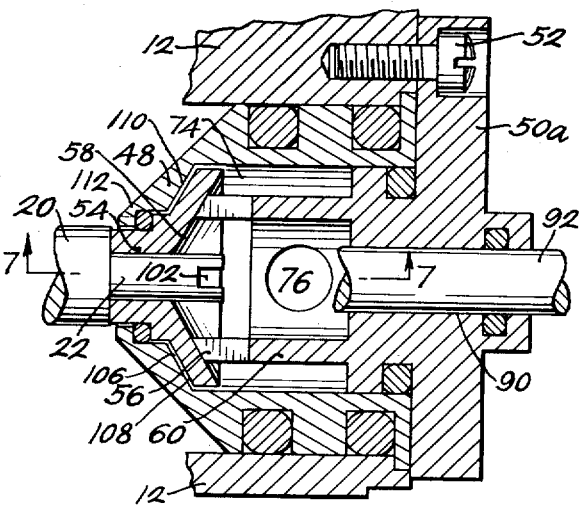
FIGURE 6 is an enlarged fragmentary longitudinal section showing the bearing.
Figure 7:
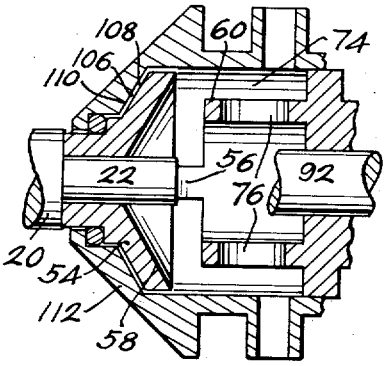
FIGURE 7 is an enlarged fragmentary longitudinal section taken along line 7—7 of FIGURE 6.

Referring now in particular to FIGURES 6 and 7 of the drawing, it will be seen that a space 106 is provided between the outer conical surface 108 of the bearing 54 and the inner conical surface 110 of the bearing housing 48 to provide for the movement of oil therebetween. Wall 112 of the bearing housing is relatively thin to provide for rapid heat transfer between the bearing and exhaust air cavity 46. The cold exhaust air from the turbine blades passing over the outer surface of the bearing housing conducts the heat away from the bearing in the exhaust air and eliminates the necessity for continuous circulation of the lubricating oil around the bearing. As already mentioned, however, the lubricating oil is in motion within the bearing housing due to the swirling effect caused by rotation of the journal. This effect maintains the lubricating oil at a relatively constant temperature and the relatively cold exhaust air has been found adequate to maintain the bearing quite cool even though the turbine is operated at speeds well above 10,000 r.p.s.

Figure 9:
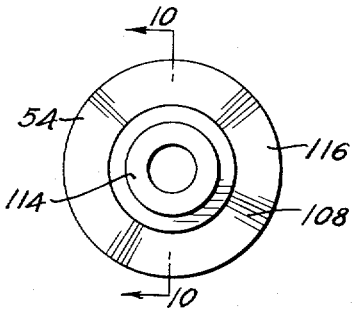
FIGURE 9 is an enlarged elevation of the bearing.
Figure 10:
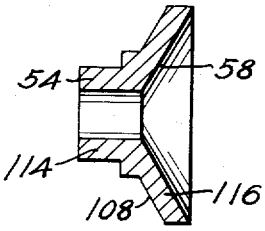
FIGURE 10 is a section of the bearing taken along line 10—10 of FIGURE 9.

The particular bearing design shown in FIGURES 9 and 10 is conducive to excellent heat transfer because of the large surface area exposed to the lubricant. The particular bearing design, shown most clearly in FIGURES 9 and 10 comprises tubular portion 114 terminating in a flaring portion 116 which is relatively thin and exposes large conical surfaces 58 and 108 to the oil.

Figure 8:
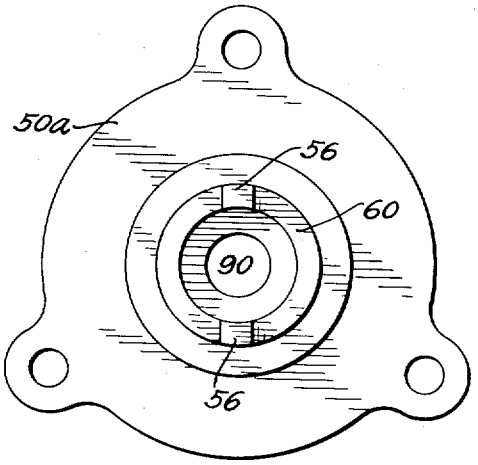
FIGURE 8 is a view showing the end plate used to retain the bearing in place within the main housing of the turbine.

End plate 50a, shown in FIGURE 8, is provided with tubular portion 60 which extends into the bearing housing in concentric spaced relation thereto and the fingers 56 extending from the tubular portion engage the inner conical surface 58 of the bearing and hold it in sealed spaced relation with respect to the bearing housing.

From the foregoing description of the invention in connection with a high-speed rotating-mirror turbine it will be seen that the many useful objects for which the novel method and apparatus for air-cooling a liquid-lubricated bearing were designed, have been achieved; and therefore, I claim:

[1. In a turbine, a housing having a hollow interior, means including a bearing within the housing dividing the interior thereof into a gas chamber and an oil chamber, means including a shaft having journals journaled for rotation within the bearing, said bearing and said shaft coacting to seal the gas chamber from the oil chamber, a turbine wheel mounted on the shaft in position to divide the gas chamber into an intake cavity and an exhaust cavity, the latter of which is in heat-exchange relation to the oil chamber, and nozzle means within the intake cavity located to receive gas from said intake cavity and direct it through the turbine wheel to the exhaust cavity to effect rotation of the shaft and cool any oil in the oil chamber upon expansion of said gas.]

2. In a turbine, a housing having a hollow interior, means including a pair of bearings arranged in spaced relation within the housing each of said bearings dividing a different portion of the interior of said housing into a gas chamber and oil chamber, means including a shaft having journals journaled for rotation within the bearings, said bearings and said shaft coacting to seal each gas chamber from its respective oil chamber, a turbine wheel mounted on the shaft in position to divide each gas chamber into an intake cavity and an exhaust cavity, the latter of which is in heat-exchange relation to each oil chamber, and nozzle means within the intake cavity located to receive gas from said intake cavity and direct it through the turbine wheels to the exhaust cavities to effect rotation of the shaft and cool any oil in the oil chambers upon expansion of said gas.

3. In a turbine, a housing having a hollow interior, spaced bearing housings mounted within the housing dividing the interior thereof into a central chamber and oil chambers on opposite ends thereof, shaft bearings within the bearing housings, a shaft having journals journaled for rotation within the shaft bearings, said shaft and said bearings coacting to seal the oil chambers from the central chamber, a mirror formed intermediate the ends of the shaft for rotation within the central chamber, means within the housing enclosing the shaft on opposite ends of the mirror and forming a gas chamber adjacent each oil chamber, turbine wheels mounted on the shaft in position to divide each gas chamber into an intake cavity and an exhaust cavity, the latter of which is in heat-exchange relationship to the adjacent oil cavity, and nozzles positioned within the intake cavities located to direct gas through the turbine wheels to the exhaust cavities to effect rotation of the mirror and cool any oil in the oil chambers upon expansion of said gas within said gas chambers.

4. The turbine as set forth in claim 3 in which the housing includes an oil reservoir with conduit means connected to deliver oil to the oil chambers, and a source of gas under pressure connected into the intake cavities and also connected into the oil reservoir to pressurize the oil around the bearings.

5. The turbine as set forth in claim 3 in which the central chamber is open through the housing to expose the mirror and the exhaust cavities are open to the atmosphere.

*6. In a turbine, a main cylindrical housing having a hollow interior comprising an axial cylindrical bore, bearing means including a pair of bearings arranged in spaced relation to each other within the housing, each of said bearings being supported by a bearing housing located in said cylindrical bore, and each of said bearings and bearing housings dividing a different portion of the interior of said main housing into a gas chamber and an oil chamber, means including a shaft having journals journaled for rotation within the bearings, said bearings, said bearing housings, and said shaft coacting to seal each gas chamber from its respective oil chamber, a turbine wheel mounted on the shaft in position to divide each gas chamber into an air intake cavity and an exhaust cavity, each exhaust cavity of which is in heat exchange relation to each oil chamber, respectively, an inner housing member within each intake cavity and having nozzle means and located to receive gas from said intake cavity through an outer annular air passage directing air to all of said nozzle means, said nozzle means being located to direct said gas through the turbine wheels to the exhaust cavities, respectively, to effect rotation of the shaft and cool any oil in the oil chambers upon expansion of said gas in the exhaust cavities.*

*7. In an air driven turbine, the combination of a cylindrical main housing having a through bore of cylindrical shape, said bore having a circular closure for one end provided with threaded means for securing the closure to the main housing, sealing one end of the main housing, said housing having a radially extending inlet port communicating with an inlet conduit, a cylindrical turbine inner housing element fitting in the other end of said through bore and closing the other end of said bore, means carried by the said main housing for securing said inner turbine housing element against rotation and longitudinal motion in said bore, said inner turbine housing having a circular bore for passing an axial shaft, a shaft in said circular bore and extending from said inner turbine housing, said inner turbine housing having an outer annular air passage communicating with said inlet, a bearing housing having a cylindrical body mounted in said cylindrical bore in the main housing, and said body having a bore, a bearing member in said latter bore, said shaft having a reduced cylindrical end and an annular shoulder, said reduced end being received in said bearing member, and said annular shoulder engaging an annular face of said bearing member, said circular closure supporting a tubular portion engaging said bearing member and securing the annular face of the bearing member against the annular shoulder on the shaft, a turbine rotor carried by the shaft and provided with turbine blades to receive air to drive the turbine, said cylindrical bore in said main housing having an exhaust cavity receiving air from the turbine blades, said annular air passage in said inner turbine housing communicating with stationary blades on an inner turbine element forming nozzles directing air against the blades of the rotor.*

*8. A fluid operated turbine comprising a round housing having a through bore and an annular expansion chamber, a bearing housing in each end of said bore, a bearing mounted in each of said bearing housings, a shaft rotatably mounted in both of said bearings, a rotor having an axial bore receiving and attached to said shaft, said rotor having turbine blades to receive air from nozzles to effect rotation of the shaft, a turbine housing having a bore secured in said through bore and having an annular fluid distributing channel formed in its periphery and opening radially outward, said round housing having a radially extending inlet port communicating with said channel and an axially extending inlet conduit extending to said port, a stator element having a cylindrical bore receiving the shaft and mounted in said bore of said turbine housing, said stator element having a reduced portion about said shaft forming in cooperation with the turbine housing an annular air distribution channel and said stator element having nozzles on its periphery for directing fluid flowing from said annular air distribution channel against the blades of the rotor to drive the rotor, said turbine housing having a plurality of apertures providing communication between said annular fluid distributing channel and said annular air distribution channel, said rotor discharging fluid into said annular expansion chamber and said expansion chamber having an enlarged lateral outlet for discharging the exhaust fluid, an end closure for one end of said bore having an opening and a spring pressed plunger extending through said opening and having a driving rib on its end for engaging in a complementary slot in the end of said shaft, a stop carried by said plunger and a spring about said plunger acting on said stop to urge the plunger outward out of engagement with the shaft, and a manual member on the end of said plunger for use in pressing the plunger inward to engage the shaft and rotate the shaft manually.*

References Cited in the file of this patent or the original patent

UNITED STATES PATENTS

| | | |
|---|---|---|
| 887,380 | Dake | May 12, 1908 |
| 900,806 | Watkins | Oct. 13, 1908 |
| 972,327 | Brien | Oct. 11, 1910 |
| 1,310,674 | Sherbondy | July 22, 1922 |
| 1,603,927 | Taylor et al. | Oct. 19, 1926 |
| 1,624,529 | Buffington et al. | Apr. 12, 1927 |
| 1,672,721 | Junggren | June 5, 1928 |
| 1,708,306 | Giesler | Apr. 9, 1929 |
| 1,878,747 | Youngblood | Sept. 20, 1932 |
| 1,889,554 | Kennedy | Nov. 29, 1932 |
| 2,098,121 | Wilkinson | Nov. 2, 1937 |
| 2,323,725 | O'Brien | July 6, 1943 |
| 2,435,042 | Johansson | Jan. 27, 1948 |
| 2,483,654 | Magdeburger | Oct. 4, 1949 |
| 2,527,446 | Jenks et al. | Oct. 24, 1950 |
| 2,709,567 | Wood | May 31, 1955 |
| 2,759,700 | Wheatley | Aug. 21, 1956 |
| 2,910,005 | Angell et al. | Oct. 27, 1959 |
| 2,991,926 | Diefenderfer | July 11, 1961 |

FOREIGN PATENTS

| | | |
|---|---|---|
| 27,045 | Great Britain | of 1904 |
| 25,910 | Great Britain | of 1907 |
| 71,844 | Norway | Mar. 24, 1947 |